US007170425B2

(12) United States Patent
Christopher et al.

(10) Patent No.: US 7,170,425 B2
(45) Date of Patent: Jan. 30, 2007

(54) SYSTEM AND METHOD FOR CREATING MULTIPLE OPERATING TERRITORIES WITHIN A METER READING SYSTEM

(75) Inventors: Russell G. Christopher, Clayton, NC (US); Raymond Kelley, Raleigh, NC (US); Dileep Rudran, Cary, NC (US); Susane K. Nemecz, Garner, NC (US)

(73) Assignee: Elster Electricity, LLC, Raleigh, NC (US)

( * ) Notice: Subject to any disclaimer, the term of this patent is extended or adjusted under 35 U.S.C. 154(b) by 135 days.

(21) Appl. No.: 10/949,927

(22) Filed: Sep. 24, 2004

(65) Prior Publication Data

US 2006/0071811 A1    Apr. 6, 2006

(51) Int. Cl.
*G08B 23/00* (2006.01)
(52) U.S. Cl. ............................ 340/870.02; 340/870.01
(58) Field of Classification Search ........... 340/870.02, 340/870.01, 870.03
See application file for complete search history.

(56) References Cited

U.S. PATENT DOCUMENTS

| | | | |
|---|---|---|---|
| 3,445,815 A | 5/1969 | Saltzberg et al. ............ 340/163 |
| 3,858,212 A | 12/1974 | Tompkins et al. ..... 343/100 CS |
| 3,878,512 A | 4/1975 | Kobayashi et al. ...... 340/168 R |
| 3,973,240 A | 8/1976 | Fong ......................... 340/151 |
| 4,031,513 A | 6/1977 | Simciak ................... 340/152 T |
| 4,056,107 A | 11/1977 | Todd et al. .................... 130/27 |
| 4,066,964 A | 1/1978 | Costanza et al. ............. 325/55 |
| 4,132,981 A | 1/1979 | White ........................ 340/203 |
| 4,190,800 A | 2/1980 | Kelly, Jr. et al. .............. 325/37 |
| 4,204,195 A | 5/1980 | Bogacki ...................... 340/151 |
| 4,218,737 A | 8/1980 | Buscher et al. .............. 364/493 |
| 4,250,489 A | 2/1981 | Dudash et al. .............. 340/147 |
| 4,254,472 A | 3/1981 | Juengel et al. .............. 364/900 |
| 4,319,358 A | 3/1982 | Sepp ............................. 375/1 |
| 4,321,582 A | 3/1982 | Banghart .................... 340/310 |
| 4,322,842 A | 3/1982 | Martinez .................... 370/204 |
| 4,328,581 A | 5/1982 | Harmon et al. ................ 371/8 |
| 4,361,851 A | 11/1982 | Asip et al. .................... 358/84 |
| 4,361,890 A | 11/1982 | Green, Jr. et al. ............. 375/1 |

(Continued)

FOREIGN PATENT DOCUMENTS

CH        682196 A5      7/1993

(Continued)

OTHER PUBLICATIONS

Desbonnet, Joe et al., "System Architecture and Implementation of CEBus/Internet Gateway", *IEEE*, 1997, 1057-1062.

(Continued)

*Primary Examiner*—Jeffery A. Hofsass
(74) *Attorney, Agent, or Firm*—Woodcock Washburn LLP (57) ABSTRACT

The present invention enables multiple operating territories to be defined, named, and managed within a meter reading system. Each operating territory may correspond to a geographic sub-section of the meter reading system that is regulated by a particular regulatory agency. Each operating territory may be assigned a set of time of use (TOU) schedules required by its corresponding regulatory agency. The set of TOU schedules assigned to each operating territory may be stored in a database.

20 Claims, 5 Drawing Sheets

U.S. PATENT DOCUMENTS

| | | | |
|---|---|---|---|
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzemeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,197,095 A | 3/1993 | Bonnett | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |
| 5,488,608 A | 1/1996 | Flammer, III | 370/85.13 |
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |
| 5,497,424 A | 3/1996 | Vanderpool | 380/34 |

| Patent No. | Date | Inventor | Class |
|---|---|---|---|
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |
| 5,521,910 A | 5/1996 | Matthews | 370/54 |
| 5,522,044 A | 5/1996 | Pascucci et al. | 395/200.06 |
| 5,524,280 A | 6/1996 | Douthitt et al. | 455/62 |
| 5,525,898 A | 6/1996 | Lee, Jr. et al. | 324/142 |
| 5,526,389 A | 6/1996 | Buell et al. | 375/200 |
| 5,528,507 A | 6/1996 | McNamara et al. | 364/483 |
| 5,528,597 A | 6/1996 | Gerszberg et al. | 370/95.3 |
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/107 |
| 5,566,332 A | 10/1996 | Adair et al. | 395/600 |
| 5,570,084 A | 10/1996 | Ritter et al. | 340/825.05 |
| 5,572,438 A | 11/1996 | Ehlers et al. | 364/492 |
| 5,590,179 A | 12/1996 | Shincovich et al. | 379/107 |
| 5,592,470 A | 1/1997 | Rudrapatna et al. | 370/320 |
| 5,594,740 A | 1/1997 | LaDue | 379/59 |
| 5,602,744 A | 2/1997 | Meek et al. | 364/464.22 |
| 5,617,084 A | 4/1997 | Sears | 331/176 |
| 5,619,192 A | 4/1997 | Ayala | 340/870.02 |
| 5,619,685 A | 4/1997 | Schiavone | 395/500 |
| 5,621,629 A | 4/1997 | Hemminer et al. | 363/56 |
| 5,627,759 A | 5/1997 | Bearden et al. | 364/483 |
| 5,631,636 A | 5/1997 | Bane | 340/825.69 |
| 5,636,216 A | 6/1997 | Fox et al. | 370/402 |
| 5,640,679 A | 6/1997 | Lundqvist et al. | 455/33.2 |
| 5,659,300 A | 8/1997 | Dresselhuys et al. | 340/870.02 |
| 5,668,803 A | 9/1997 | Tymes et al. | 370/312 |
| 5,668,828 A | 9/1997 | Sanderford, Jr. et al. | 375/202 |
| 5,673,252 A | 9/1997 | Johnson et al. | 370/449 |
| 5,684,472 A | 11/1997 | Bane | 340/870.02 |
| 5,684,799 A | 11/1997 | Bigham et al. | 370/397 |
| 5,691,715 A | 11/1997 | Ouellette | 340/870.09 |
| 5,692,180 A | 11/1997 | Lee | 395/610 |
| 5,696,501 A | 12/1997 | Ouellette et al. | 340/870.02 |
| 5,696,765 A | 12/1997 | Safadi | 370/436 |
| 5,699,276 A | 12/1997 | Roos | 364/514 A |
| 5,714,931 A | 2/1998 | Petite et al. | 340/539 |
| 5,715,390 A | 2/1998 | Hoffman et al. | 395/188.01 |
| 5,717,604 A | 2/1998 | Wiggins | 364/514 C |
| 5,719,564 A | 2/1998 | Sears | 340/870.02 |
| 5,732,078 A | 3/1998 | Arango | 370/355 |
| 5,744,657 A | 4/1998 | Webster | 364/510 |
| 5,745,901 A | 4/1998 | Entner et al. | 707/103 |
| 5,748,104 A | 5/1998 | Argyroudis et al. | 340/870.11 |
| 5,748,619 A | 5/1998 | Meier | 370/278 |
| 5,751,914 A | 5/1998 | Coley et al. | 395/51 |
| 5,751,961 A | 5/1998 | Smyk | 395/200.47 |
| 5,754,772 A | 5/1998 | Leaf | 395/200.33 |
| 5,754,830 A | 5/1998 | Butts et al. | 395/500 |
| 5,757,783 A | 5/1998 | Eng et al. | 370/315 |
| 5,768,148 A | 6/1998 | Murphy et al. | 364/492 |
| 5,778,368 A | 7/1998 | Hogan et al. | 707/10 |
| 5,787,437 A | 7/1998 | Potterveld et al. | 707/103 |
| 5,790,789 A | 8/1998 | Suarez | 395/200.32 |
| 5,790,809 A | 8/1998 | Holmes | 395/200.58 |
| 5,801,643 A | 9/1998 | Williams et al. | 340/870.02 |
| 5,805,712 A | 9/1998 | Davis | 380/50 |
| 5,808,558 A | 9/1998 | Meek et al. | 340/870.01 |
| 5,809,059 A | 9/1998 | Souissi et al. | 375/202 |
| 5,822,521 A | 10/1998 | Gartner et al. | 395/200.6 |
| 5,850,187 A | 12/1998 | Carrender et al. | 340/10.42 |
| 5,862,391 A | 1/1999 | Salas et al. | 395/750.01 |
| 5,872,774 A | 2/1999 | Wheatley, III et al. | 370/335 |
| 5,874,903 A | 2/1999 | Shuey et al. | 340/870.02 |
| 5,875,183 A | 2/1999 | Nitadori | 370/328 |
| 5,875,402 A | 2/1999 | Yamawaki | 455/502 |
| 5,884,184 A | 3/1999 | Sheffer | 455/521 |
| 5,892,758 A | 4/1999 | Argyroudis | 370/335 |
| 5,896,382 A | 4/1999 | Davis et al. | 370/401 |
| 5,897,607 A | 4/1999 | Jenney et al. | 702/62 |
| 5,898,387 A | 4/1999 | Davis et al. | 340/870.02 |
| 5,907,491 A | 5/1999 | Canada et al. | 364/468.15 |
| 5,907,540 A | 5/1999 | Hayashi | 370/315 |
| 5,910,799 A | 6/1999 | Carpenter et al. | 345/333 |
| 5,923,269 A | 7/1999 | Shuey et al. | 340/870.02 |
| 5,926,103 A | 7/1999 | Petite | 340/825.19 |
| 5,926,531 A | 7/1999 | Petite | 379/144 |
| 5,943,375 A | 8/1999 | Veintimilla | 375/355 |
| 5,944,842 A | 8/1999 | Propp et al. | 714/701 |
| 5,953,319 A | 9/1999 | Dutta et al. | 370/238 |
| 5,959,550 A | 9/1999 | Giles | 340/870.02 |
| 5,960,074 A | 9/1999 | Clark | 379/310 |
| 5,963,146 A | 10/1999 | Johnson et al. | 340/870.1 |
| 5,974,236 A | 10/1999 | Sherman | 395/200.51 |
| 5,986,574 A | 11/1999 | Colton | 340/870.02 |
| 6,000,034 A | 12/1999 | Lightbody et al. | 713/202 |
| 6,028,522 A | 2/2000 | Petite | 340/641 |
| 6,034,988 A | 3/2000 | VanderMey et al. | 375/202 |
| 6,035,201 A | 3/2000 | Whitehead | 455/455 |
| 6,041,056 A | 3/2000 | Bigham et al. | 370/395 |
| 6,061,604 A | 5/2000 | Russ et al. | 700/90 |
| 6,067,029 A | 5/2000 | Durston | 340/870.03 |
| 6,073,169 A | 6/2000 | Shuey et al. | 709/217 |
| 6,073,174 A | 6/2000 | Montgomerie et al. | 709/224 |
| 6,078,251 A | 6/2000 | Landt et al. | 340/10.41 |
| 6,078,785 A | 6/2000 | Bush | 455/7 |
| 6,078,909 A | 6/2000 | Knutson | 705/59 |
| 6,088,659 A | 7/2000 | Kelley et al. | 702/62 |
| 6,091,758 A | 7/2000 | Ciccone et al. | 375/132 |
| 6,100,817 A | 8/2000 | Mason, Jr. et al. | 340/870.02 |
| 6,112,192 A | 8/2000 | Capek | 705/59 |
| 6,124,806 A | 9/2000 | Cunningham et al. | 340/870.02 |
| 6,128,276 A | 10/2000 | Agee | 370/288 |
| 6,137,423 A | 10/2000 | Glorioso et al. | 340/870.02 |
| 6,150,955 A | 11/2000 | Tracy et al. | 340/870.02 |
| 6,154,487 A | 11/2000 | Murai et al. | 375/150 |
| 6,160,933 A | 12/2000 | Laude | 455/12.1 |
| 6,160,993 A | 12/2000 | Wilson | 455/12.1 |
| 6,172,616 B1 | 1/2001 | Johnson et al. | 340/870.12 |
| 6,195,018 B1 * | 2/2001 | Ragle et al. | 340/870.01 |
| 6,199,068 B1 | 3/2001 | Carpenter | 707/100 |
| 6,208,266 B1 | 3/2001 | Lyons et al. | 340/870.02 |
| 6,218,953 B1 | 4/2001 | Petite | 340/641 |
| 6,233,327 B1 | 5/2001 | Petite | 379/155 |
| 6,246,677 B1 | 6/2001 | Nap et al. | 370/346 |
| 6,249,516 B1 | 6/2001 | Brownrigg et al. | 370/338 |
| 6,363,057 B1 | 3/2002 | Ardalan et al. | 370/252 |
| 6,393,341 B1 | 5/2002 | Lawrence et al. | 700/286 |
| 6,396,839 B1 | 5/2002 | Ardalan et al. | 370/401 |
| 6,421,731 B1 | 7/2002 | Ciotti, Jr. et al. | 709/238 |
| 6,430,268 B1 | 8/2002 | Petite | 379/39 |
| 6,437,692 B1 | 8/2002 | Petite et al. | 340/540 |
| 6,446,192 B1 | 9/2002 | Narasimhan et al. | 712/29 |
| 6,643,278 B1 | 11/2003 | Panasik et al. | 370/330 |
| 6,657,549 B1 | 12/2003 | Avery | 340/825.49 |
| 6,684,245 B1 | 1/2004 | Shuey et al. | 709/223 |
| 6,751,563 B2 | 6/2004 | Spanier et al. | 702/61 |
| 2001/0002210 A1 | 5/2001 | Petite | 379/155 |
| 2001/0024163 A1 | 9/2001 | Petite | 340/628 |
| 2002/0012323 A1 | 1/2002 | Petite | 370/252 |
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0026957 A1 | 3/2002 | Reyman | 137/39 |
| 2002/0027504 A1 | 3/2002 | Davis et al. | 340/540 |
| 2002/0031101 A1 | 3/2002 | Peite et al. | 370/310 |

| | | | |
|---|---|---|---|
| 2002/0125998 A1 | 9/2002 | Petite et al. | 340/286.01 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0202512 A1 | 10/2003 | Kennedy | 370/389 |
| 2004/0113810 A1 | 6/2004 | Mason, Jr. et al. | 340/870.02 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

Markwalter, Brian et al., "CEBus Network Layer Description", *IEEE*, 1989, 571-575.
Newtown, Harry, *Newton's Telecom Dictionary*, Flatiron Publishing, Inc., 10<sup>th</sup> Ed., 1996, LAN (1 of 1): Cebus Overview (1-3): Cebus Industry Council (1 of 1).
Newtown, Harry, *Newton's Telecom Dictionary*, 10th Edition, 1996, 243.
International Search Report issued in International Application No. PCT/US98/11170 Date of Mailing: Oct. 7, 1998.
International Search Report issued in International Application No. PCT/US98/19034 Date of Mailing: Feb. 1, 1999.
Internet Printout, http://www.ram.com BellSouth Wireless Data—Paging, Mobitex, Network, Business, Sep. 23, 1998:—Mobitex®: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, a RAM Mobile Data White Paper, Oct. 1995—Comparative Analysis of Coverage and Performance: RAM & Ardis, 1998.
Internet Printout, http://www.ardis.com "Ardis Two-Way, Wireless Data Communications," ARDIS, Sep. 23, 1998.
Internet Prinout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.
Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.
"MV-90 Read Only System" UTS Software Solutions For Utility Customers, no date, no page numbers or pages.
Rappaport, T. S., "Wireless Communications, Principles and Practice," Prentice Hall PTR, 1996, pp. 410-413.
Brochure: TRF6900 Single-Chip RF Transceiver, Texas Instrument, 2001©.
Corcoran, P.M. et al., "CEBus Network Access via the World-Wide-Web", *International Conference on Consumer Electronics*, Jun. 5-7, 1996, 236-237, XP-002218722.
Corcoran, P.M. et al., "Browser-Style Interface to a Home Automation Network", *IEEE Trans. On Consumer Electronics*, Nov. 1, 1997, 43(4), 1063-1069, XP-000768559.
Chlamtac, I. et al., "Optimization the System of Virtual Paths", *IEEE ACM Transactions on Networking*, 1994, 2(6), 581-586.
Leung, V.C.M., "Internetworking Wireless Terminals to Local Area Networks Via Radio Bridges", *ICWC*, 1992, 126-129.
Pollini, G.P. et al., "Path Optimization Procedures for Efficient Routing of Information after an Inter-Switch Handover", *IEEE*, 1994, 1-5.
Rajagopalan, B. et al., "A New Responsive Distributed Shortest-Path Routing Algorithm", *ACM*, 1989, 237-246.
Norenkov, et al., *Telecommunication Technologies and Networks, Moscow Bauman Technical School*, 1988, (Signed for publication on Dec. 10, 1997), pp. 116-118, 80-87 [1] English Language Abstract Provided.
Brownrigg, E. Ph.D., "Developing the Information Superhighway Issues for Libraries", *Library Perspectives on NREN*, The National Research and Education Network, 1990, 55-63.
Brownrigg, E.B., "The Internet as an External Economy: The Emergence of the Invisible Hand", *Library Administration and Management*, 1991, 95-97.
Frankel, M.S., "Packet Radios Provide Link for Distributed, Survivable C3 in Post-Attack Scenarios", *MSN*, Jun. 1983, 80-108.
Gower, N. et al., "Congestion Control Using Pacing in a Packet Radio Network", *IEEE Military Communications Conference*, 1982, 1, 23.1-1, 23-1-6.
Johnson, D.B., "Routing in Ad Hoc Networks of Mobile Hosts", *IEEE*, 1995, 158-163.
Jubin, J., "Current Packet Radio Networks Protocols", *IEEE Infocom Proceedings*, 1985, 86-92.
Jubin, J. et al., "The DARPA Packet Radio Network Protocols", *Proceedings of the IEEE*, 1987, 75(1), 21-32.
Kahn, R.E., "The Organization of Computer Resources into a Packet Radio Network", *IEEE Transactions on Communications*, 1977, 25(1), 169-178.
Kahn, R.E., et al., "Advances in Packet Radio Technology", *proceedings of the IEEE*, 1978, 66(11), 1468-1496.
Lauer, G. et al., "Survivable Protocols for Large Scale Packet Radio Networks", *IEEE Global Telecommunications Conference*, 1984, 468-471.
Lynch, C.A., et al., "Electronic Publishing, Electronic Imaging, and Document Delivery", *Electronic Imaging, International Electronic Imaging Exposition & Conference*, 1986, 662-667.
Lynch, C.A. et al., "The Telecommunications Landscape", 1986, 7 pages.
Lynch, C.A. et al., "Routing, Repeating, Power Control and Directional Techniques", *Packet Radio Networks*, Architectures, Protocols, Technologies and Applications, 1987, Ch. 5, 105-129, 259-274.
MacGregor, W. et al., "Multiple Control Stations in Packet Radio Networks", *IEEE Military Communications Conference*, 1982, 10.3-1-10.3-5.
Shachan, N. et al., "A Packet Radio Network for Library Automation", *IEEE Military Communications Conference*, 1987, 2, 21.3. 1-21.3.7.
Shacham, N. et al., "Future Directions in Packet Radio Technology", *IEEE Infocom Proceedings*, 1985, 93-98.
Westcott, J.A., "Issues in Distributed Routing for Mobile Packet Radio Networks", *IEEE*, 1982, 233-238.
Wescott, J. et al., "A Distributed Routing Design for a Broadcast Environment", *IEEE Military Communications Conference*, 1982, 10.4-1-10.4-5.
"Packet Radio: Applications for Libraries in Developing Countries", *UDT Series on Data Communication Technologies and Standards for Libraries*, 1993, Ch 1-6, 87 pages.

\* cited by examiner

SYSTEM AND METHOD FOR CREATING MULTIPLE OPERATING TERRITORIES WITHIN A METER READING SYSTEM

FIELD OF THE INVENTION

The present invention relates to wireless networks for collecting data, and more particularly, to systems and methods for creating multiple operating territories within a meter reading system.

BACKGROUND OF THE INVENTION

The collection of meter data from electrical energy, water, and gas meters has traditionally been performed by human meter-readers. The meter-reader travels to the meter location, which is frequently on the customer's premises, visually inspects the meter, and records the reading. The meter-reader may be prevented from gaining access to the meter as a result of inclement weather or, where the meter is located within the customer's premises, due to an absentee customer. This methodology of meter data collection is labor intensive, prone to human error, and often results in stale and inflexible metering data.

Some meters have been enhanced to include a one-way radio transmitter for transmitting metering data to a receiving device. A person collecting meter data that is equipped with an appropriate radio receiver need only come into proximity with a meter to read the meter data and need not visually inspect the meter. Thus, a meter-reader may walk or drive by a meter location to take a meter reading. While this represents an improvement over visiting and visually inspecting each meter, it still requires human involvement in the process.

Conventional meter reading systems employ a fixed wireless network to assist in the process of automated data collection. Devices such as, for example, repeaters and gateways are permanently affixed on rooftops and pole-tops and strategically positioned to receive data from enhanced meters fitted with radio-transmitters. Typically, these transmitters operate in the 902–928 MHz range and employ Frequency Hopping Spread Spectrum (FHSS) technology to spread the transmitted energy over a large portion of the available bandwidth.

Data is transmitted from the meters to the repeaters and gateways and ultimately communicated to a central location. While fixed wireless networks greatly reduce human involvement in the process of meter reading, such systems require the installation and maintenance of a fixed network of repeaters, gateways, and servers. Identifying an acceptable location for a repeater or server and physically placing the device in the desired location on top of a building or utility pole is a tedious and labor-intensive operation. When a portion of the network fails to operate as intended, human intervention is typically required to test the effected components and reconfigure the network to return it to operation.

Conventional meter reading systems typically do not support remote configuration of TOU metering rates. Another drawback of a conventional meter reading systems is that they are limited with respect to operations across multiple regulatory agencies that span a multi-state utility's geographical service territory. For example, a single meter reading system may be operated in a geographical area that spans two neighboring states such as North Carolina (NC) and South Carolina (SC). NC regulations will require one time of use (TOU) fee schedule, while SC regulations will likely require a different TOU fee schedule. Accordingly, NC meters will be configured with one set of TOU programs, while SC meters will be configured with a different set of TOU programs.

Conventional meter reading systems do not enable the NC and SC TOU configurations to be defined at a server and then propagated to collectors in each respective state. Rather, conventional meter reading systems require that collectors in NC be individually pre-programmed with the NC set of TOU programs, while collectors in SC be individually pre-programmed with the SC set of TOU programs. This individual pre-programming is particularly cumbersome when a large number of collectors are operative in both states. Furthermore, if either of the two states change their TOU regulations, conventional meter reading systems require the collectors within the respective state to be manually re-programmed with the updated set of TOU schedules.

Thus, while existing meter reading systems have reduced the need for human involvement in the daily collection of meter data, such systems still require substantial human investment in meter configuration in geographic areas that span regulatory boundaries. Therefore, there is a need for systems and methods for creating multiple operating territories within a meter reading system.

SUMMARY OF THE INVENTION

The present invention enables multiple operating territories to be defined, named, and managed within a meter reading system. Each operating territory may correspond to a geographic sub-section of the meter reading system that is regulated by a particular regulatory agency. Each operating territory may be assigned a set of time of use (TOU) programs required by its corresponding regulatory agency. The set of TOU programs has a selected quantity of TOU programs that are arranged in a selected order. The TOU programs assigned to each operating territory may be stored in a database According to an aspect of the invention, each collector within the system has a fixed number of slots which may or may not contain a TOU program. The order of the TOU programs in the collector slots is important to ensure proper communication protocols between a collector and registered meters. The operating territory is used to manage the quantity and order of the TOU programs in the collectors by transparently assigning and removing TOU programs to and from the collector slots based on the quantity and order of TOU programs in the set.

According to another aspect of the invention, any number of collectors within the meter reading system may be assigned to a particular operating territory. Once the collectors are assigned, the operating territory's set of TOU programs is retrieved from the database. The collectors are then configured with the retrieved set of TOU programs such that the quantity and order of the TOU programs in the collector slots is identical to the quantity and order of TOU programs in the set. Therefore, after configuration, a collector has the same indexed list of TOU programs as the operating territory to which it is assigned.

According to another aspect of the invention, any number of meters within an operating territory may be assigned to a TOU program that is selected from the operating territory's set of TOU programs. If the meters have registered to a collector and the meter reading system is aware of the registration, then the meters are configured with the index of the selected TOU program. However, if the meters are not registered to a collector or if the meter reading system is unaware of the registration, then the TOU assignment is recorded but the meters are not immediately configured with the index. The meters may be later configured with the index when the meter reading system becomes aware of the meters' registration.

According to another aspect of the invention, any number of meters within the meter reading system may spontaneously register to a particular collector. For each meter, if its TOU program index does not look up to a TOU program stored in the collector's list of TOU schedules, then the registration of the meter may be refused by the collector. This aspect of the invention is particularly advantageous with respect to operating territories in close geographic proximity to one another. Specifically, if the TOU assignments of the close operating territories are managed such that the indexes that are assigned TOU programs in each of the operating territories are not assigned TOU programs in the other operating territories, then the meters within each of the operating territories may be prevented from registering with collectors in the other operating territories.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1–5. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter becomes registered with the collector that can provide a communication path to the meter. The collectors receive and compile metering data from a plurality of meter devices via wireless communications. A communications server communicates with the collectors to retrieve the compiled meter data.

Figure 1:
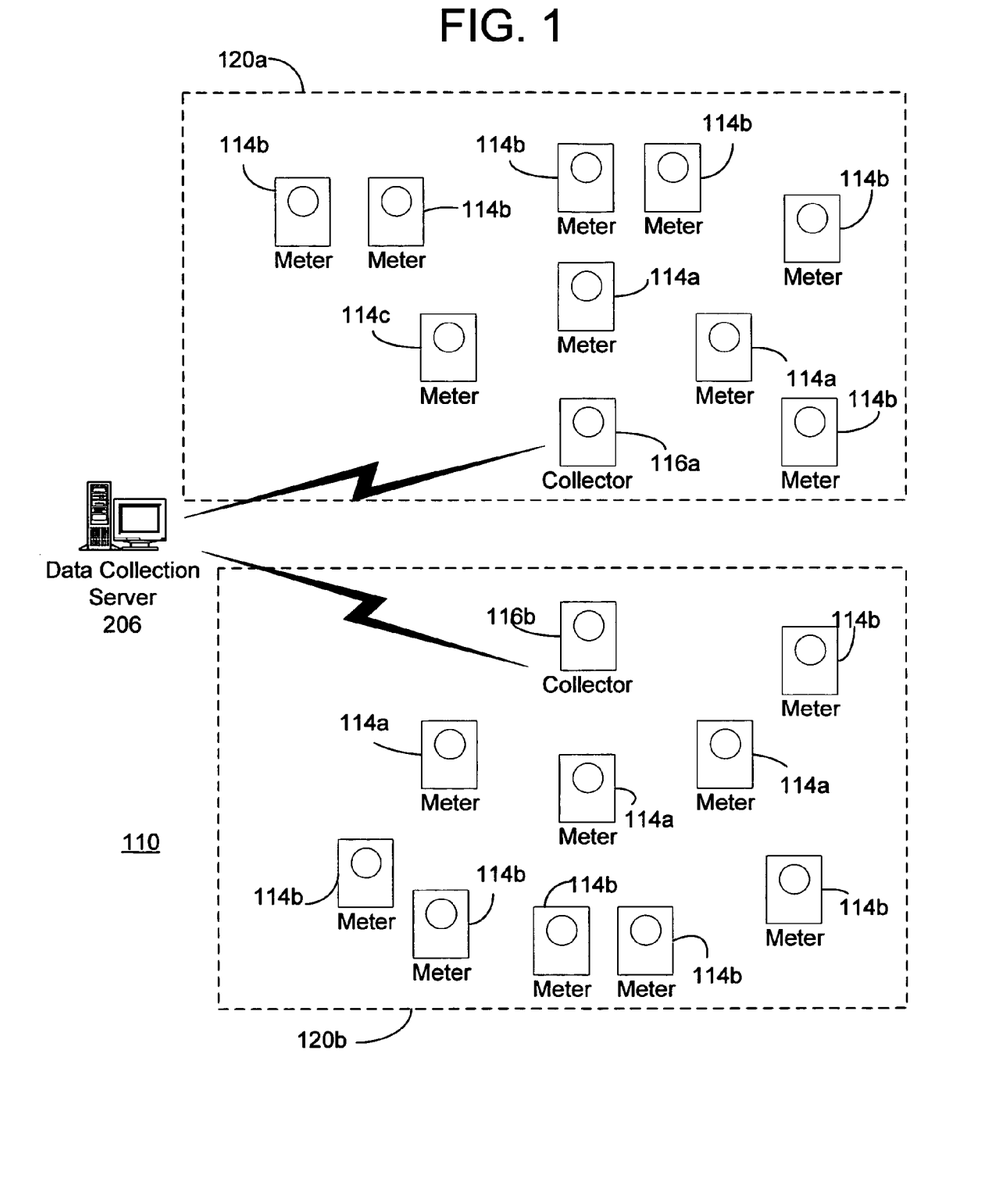
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, a electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, meters 114 may be, for example, an electrical meter manufactured by Elster Electricity, LLC.

A collector 116 and the meters 114 for which it is configured to receive meter data define a subnet/LAN 120 of system 110. As used herein, meters 114 and collectors 116 maybe considered as nodes in the subnet 120. For each subnet/LAN 120, data is collected at collector 116 and periodically transmitted to a data collection server 206. The data collection server 206 stores the data for analysis and preparation of bills. The data collection server 206 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS). As illustrated, meters 114a are "first level" meters that communicate with collector 116, whereas meters 114b are higher level meters that communicate with other meters in the network that forward information to the collector 116.

Figure 2:
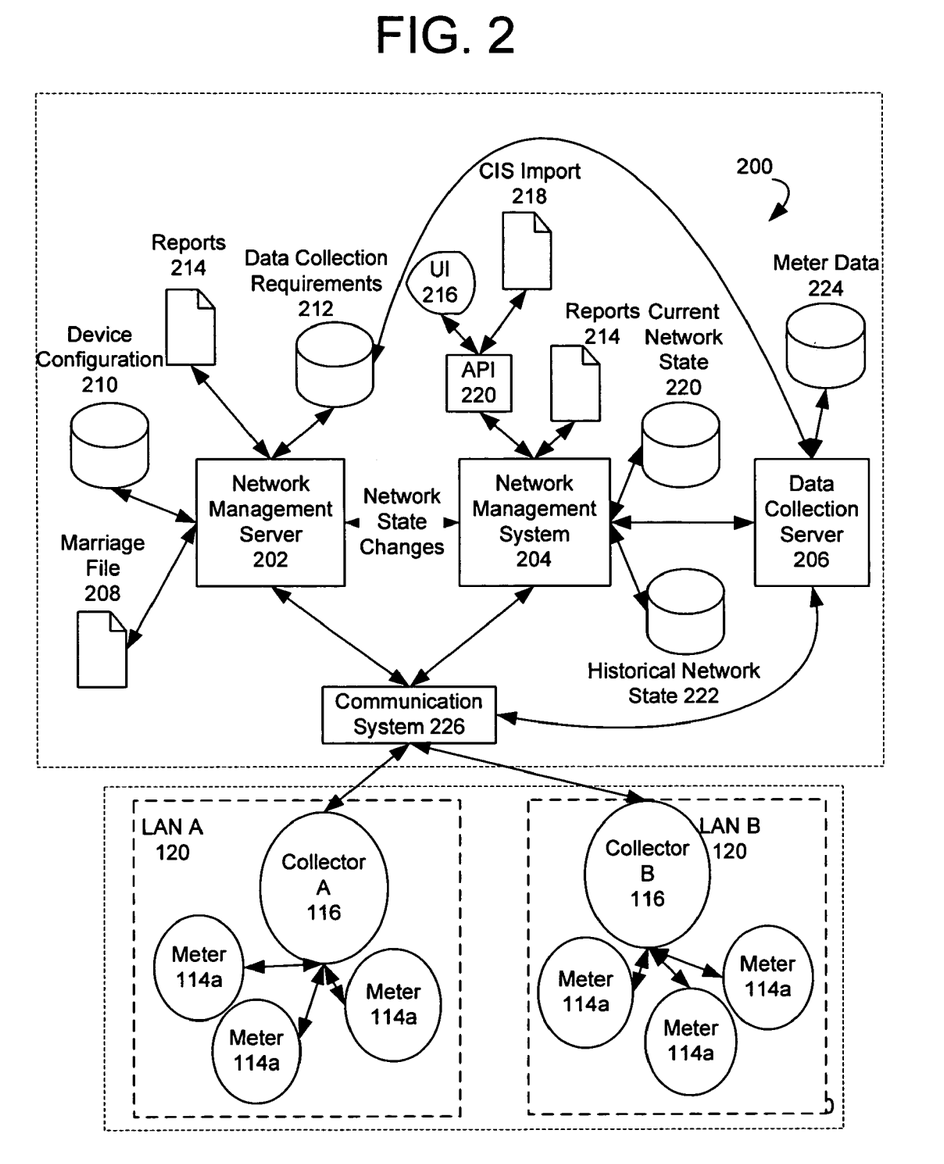
FIG. 2 expands upon the diagram of FIG. 1 and illustrates a system in which the present invention is embodied.

Referring now to FIG. 2, there is illustrated a system 200 in which the present invention may be embodied. The system 200 includes a network management server 202, a network management system (NMS) 204 and a data collection server 206 that together manage one or more subnets/LANs 120 and their constituent nodes. The NMS 204 tracks changes in network state, such as new nodes registering/unregistering with the system 200, node communication paths changing, etc. This information is collected for each subnet/LAN 120 and are detected and forwarded to the network management server 202 and data collection server 206.

In accordance with an aspect of the invention, communication between nodes and the system 200 is accomplished using the LAN ID, however it is preferable for customers to query and communicate with nodes using their own identifier. To this end, a marriage file 208 may be used to correlate a customer serial number and LAN ID for each node (e.g., meters 114a) in the subnet/LAN 120. A device configuration database 210 stores configuration information regarding the nodes. For example, in the metering system 110, the device configuration database may the time of use (TOU) program assignment for the meters 114a communicating to the system 200. A data collection requirements database 212 contains information regarding the data to be collected on a per node basis. For example, a user may specify that metering data such as load profile, demand, TOU, etc. is to be collected from particular meter(s) 114*a*. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may be implemented in accordance with the present invention. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

The present invention enables multiple operating territories to be defined, named, and managed within a meter reading system. Each operating territory may correspond to a geographic sub-section of the meter reading system that is regulated by a particular regulatory agency. For example, referring back to FIG. 1, LAN 120*a* may be a first operating territory, while LAN 120*b* may be a second operating territory. LAN 120*a* may, for example, be located in North Carolina, while LAN 120*b* may be located in South Carolina. For ease of description, LAN's 120*a* and 120*b* will be interchangeably referred to as operating territories 120*a* and 120*b*, respectively. However, it is noted that a single operating territory may include more than one LAN.

Each operating territory 120 may be assigned a set of time of use (TOU) programs required by its corresponding regulatory agency. For example, operating territory 120*a* may be assigned a set of TOU programs proscribed by a North Carolina regulatory agency, while operating territory 120*b* may be assigned a set of TOU programs proscribed by a South Carolina regulatory agency. The set of TOU programs assigned to each operating territory may be stored in a database such as device configuration database 210.

Figure 3:
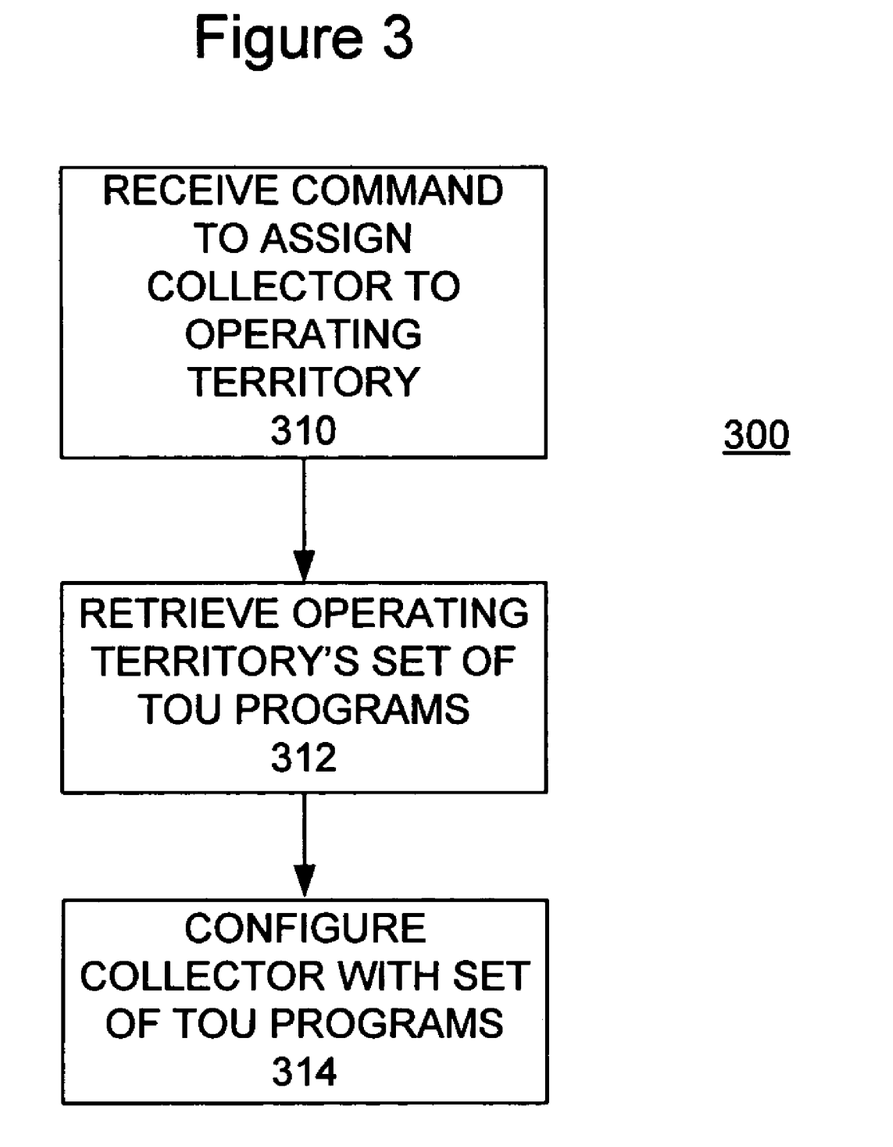
FIG. 3 illustrates an exemplary sequence of events when a collector is assigned to an operating territory.

Collectors within the meter reading system may be assigned to a particular operating territory. For example, as depicted in FIG. 1, collector 116*a* is assigned to operating territory 120*a*, while collector 116*b* is assigned to operating territory 120*b*. It is noted, however, that more than one collector may be assigned to a single operating territory. FIG. 3 illustrates an exemplary sequence of events when a collector is assigned to an operating territory. At step 310, a command to assign the collector to the operating territory is received at NMS 204. The command may be received manually from, for example, a system operator or programmatically from, for example, a CIS software system. If the command is received manually, then it may be received through UI 216, while, if the command is received programmatically, then it may be received through CIS import 218. As should be appreciated, at step 310, the collector may be assigned to an initial operating territory or the collector may be re-assigned from one operating territory to another.

At step 312, the set of TOU programs assigned to the operating territory are retrieved. For example, NMS 204 may retrieve a set of North Carolina TOU schedules assigned to operating territory 120*a*. The TOU programs may be retrieved from configuration database 210. The TOU programs are originally assigned to the operating territory when the operating territory is first defined. The TOU programs assigned to the operating territory may also be updated at any time. At step 314, the collector is configured with the retrieved set of TOU programs such that the order of TOU programs in the collector is identical to the order of TOU programs in the set of TOU programs assigned to the operating territory and stored at configuration database 210. Therefore, after configuration, each collector has the same indexed list of TOU programs as the operating territory to which it is assigned.

As should be appreciated, the command received at step 310 may assign more than one collector to a single operating territory. If multiple collectors are assigned, then, at step 314, they are all configured with the set of TOU programs. Accordingly, the present invention enables every collector within an operating territory to be configured or re-configured with only a single command.

Figure 4:
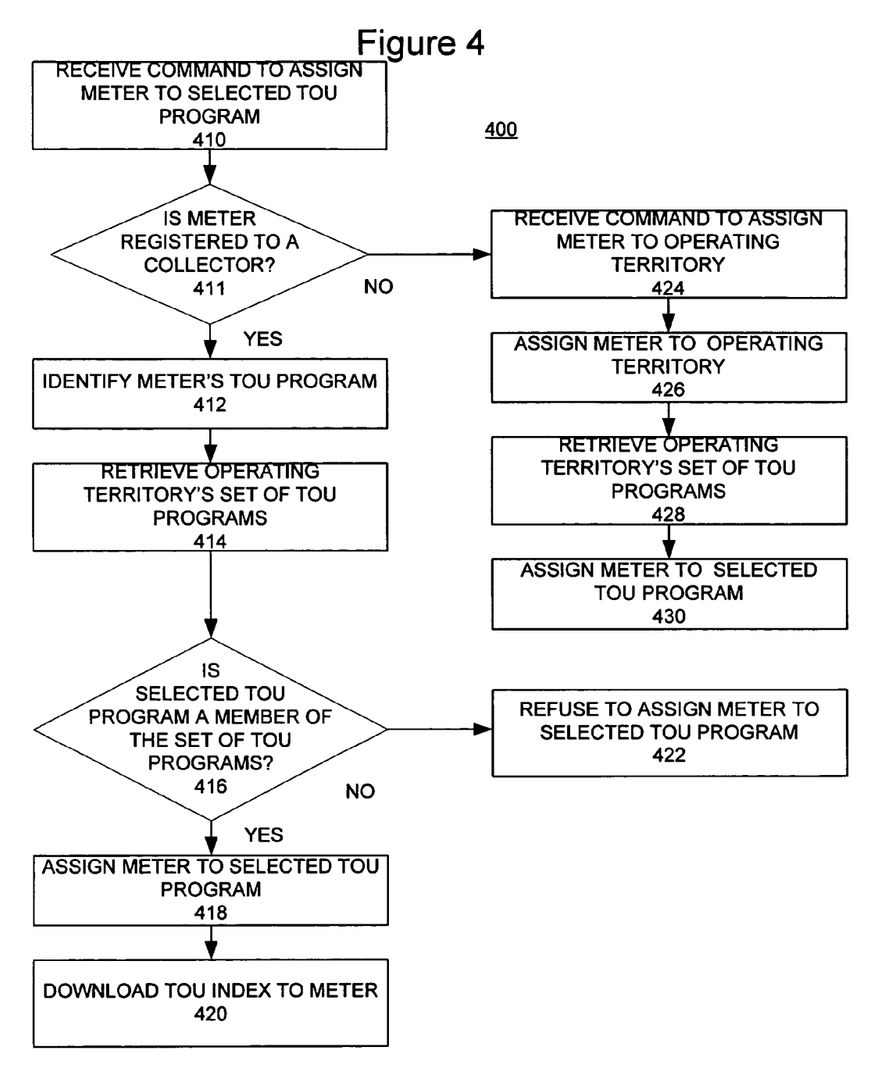
FIG. 4 illustrates an exemplary sequence of events when a meter is assigned to a selected time of use program.

FIG. 4 illustrates an exemplary sequence of events when a meter is assigned to a selected TOU program. At step 410, a command to assign the meter to the selected TOU program is received at NMS 204. The command may be received manually from, for example, a system operator or programmatically from, for example, a CIS software system. If the command is received manually, then it may be received through UI 216, while, if the command is received programmatically, then it may be received through CIS import 218. As should be appreciated, at step 410, the meter may be assigned to an initial selected TOU program or the meter may be re-assigned from one selected TOU program to another.

At step 411, it is determined whether the meter is registered to a collector. If the meter is registered, then, at step 412, the meter's operating territory is identified. The meter's operating territory may be inferred based on the operating territory of the collector to which the meter is registered. For example, meter 114*c* is registered with collector 116*a*, which is assigned to operating territory 120*a*. Thus, it may be inferred that meter 114*c* is within operating territory 120*a*. At step 414, the set of TOU programs assigned to the operating territory is retrieved. For example, NMS 204 may retrieve a set of North Carolina TOU programs assigned to operating territory 120*a*.

At step 416, it is determined whether the selected TOU program for the meter is within the set of TOU programs assigned to the operating territory. For example, it may be determined whether the selected TOU program for meter 114*c* is within the set of North Carolina TOU programs. If so, then, at step 418, the meter is assigned to the selected TOU program, and, at step 420, the TOU index of the selected TOU program is downloaded to the meter. If the selected TOU program is not within the set of TOU programs assigned to the operating territory, then, at step 420, the assignment of the meter to the selected TOU program is refused. Thus, the TOU programs available for assignment to a meter may be limited to the TOU programs assigned to the meter's operating territory. If the assignment of a meter is refused, then an error message may be displayed via UI 216.

If, at step 411, it is determined that the meter is unregistered, then, at step 424, a command is received to assign the meter to a selected operating territory, and, at step 426, the meter is assigned to the selected operating territory. At step 428, the set of TOU programs assigned to the selected operating territory is retrieved from configuration database 210, and, at step 430, the meter is assigned to the selected TOU program. Notably, if the meter is unregistered, then the index of the selected time of use program is not immediately downloaded to the meter. The index may be later downloaded to the meter if the meter attempts to spontaneously register with the collector at a future time.

As should be appreciated, at step 410, a single command may be received to assign multiple meters to a selected TOU program. In this scenario, steps 412–420 may be performed simultaneously for each of the meters.

When operating territories are not in close geographic proximity to one another, the meters within one operating territory are typically out of the range of the collectors in other operating territories. For example, if operating territories 120a and 120b are not in close proximity to one another, then the meters within operating territory 120a will likely be out of the range of collector 116b in operating territory 120b. In this scenario, the meters within operating territory 120a are incapable of registering with collector 116b, and, therefore, the meters within operating territory 120a will reference an appropriate TOU program in collector 116a.

However, when operating territories are in close geographic proximity to one another, the meters within one operating territory may be capable of registering with one or more collectors in another operating territory. This problem may occur when the collector and meter firmware does not support the configuration of a particular identifier for the operating territories. The registration of a meter to another operating territory's collector is problematic because it may result in deficient metering if the meter's index of the TOU programs references a TOU program in the collector that is not assigned to the meter's operating territory.

The present invention provides a safeguard to ensure that a meter within one operating territory does not register with a collector in close proximity that is in another operating territory. This safeguard is available when the quantity of TOU indexes available at each collector exceeds the combined quantity of the TOU programs assigned to each of the operating territories in close proximity to one another. Furthermore, the TOU programs should be partitioned such that the TOU programs assigned to each of the operating territories associate to unique indexes. Thus, when a meter from one operating territory attempts to register with a collector from another operating territory, the collector will refuse to register the meter because the TOU index for the meter will map to an empty TOU program at the collector. This safeguard is described below with reference to FIG. 5, which illustrates an exemplary sequence of events when a meter registers to a collector.

Figure 5:
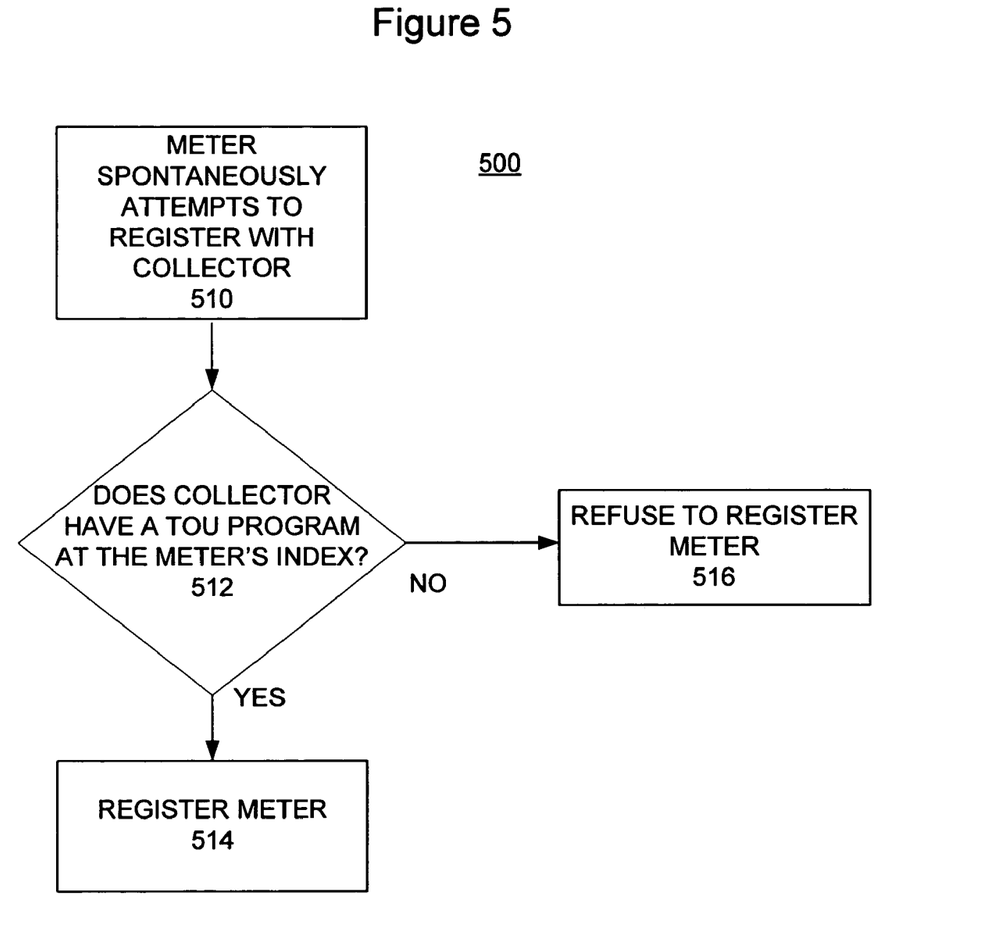
FIG. 5 illustrates an exemplary sequence of events when a meter is registered to a collector.

At step 510, a meter spontaneously attempts to register to a collector. At step 512, it is determined whether the collector has a TOU program at the meter's TOU index. If the index of the meters selected TOU program has not yet been downloaded to the meter, then it may be done so at step 510.

If the collector has a TOU program at the meter's index, then at step 514, the collector will register the meter. If, on the other hand, the collector does not have a TOU program at the meter's index, then at step 516, the collector will refuse to register the meter. For example, meter 114c in operating territory 120a may attempt to register to collector 116b in operating territory 120b. Because meter 114c is in operating territory 120a, meter 114c will have a TOU index that looks up to an empty program in the collector 116b. Thus, the registration of meter 114c will be refused. The same scenario will occur if a meter from operating territory 120b may attempts to register to collector 116a in operating territory 120a.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A method for creating a plurality of operating territories within a meter reading system, each operating territory having an assigned set of time of use programs, the method comprising:

providing to a configuration database an identification of the plurality of operating territories and, for each operating territory, a listing of the set of time of use programs assigned to the operating territory;

receiving a command to assign a collector at a remote location to a first operating territory;

responsive to the command, querying the configuration database to identify the set of time of use programs assigned to the first operating territory: and configuring the collector at the remote location with the set of time of use programs assigned to the first operating territory.

2. The method of claim 1, comprising:

receiving a command to assign a plurality of collectors to the first operating territory; and responsive to the command, querying the configuration database to identify the set of time of use programs assigned to the first operating territory: and configuring the plurality of collectors with the set of time of use programs assigned to the first operating territory.

3. The method of claim 1, further comprising:

receiving a command to modify at least one of the selected quantity of time of use programs assigned to the first operating territory; and reconfiguring the collector such that the collector has at least one of the modified time of use programs.

4. The method of claim 1, comprising providing to the configuration database the identification of the plurality of operating territories and, for each operating territory, the listing of the set of time of use programs assigned to the operating territory, wherein each of the operating territories is assigned a completely different set of time of use programs from one another, such that a total number of time of use programs available in the overall meter reading system is equivalent to a total number of operating systems within the overall meter reading system multiplied by a number of time of use programs that are assigned to each of the operating territories.

5. A method for approving a registered meter for assignment to a selected time of use program, the method comprising:

identifying an operating territory within which the meter operates;

retrieving a set of time of use programs assigned to the operating territory;

determining whether the selected time of use program is a member of the set of time of use programs assigned to the operating territory;

if so, then:

assigning the meter to the selected time of use program; and configuring the meter with an index of the selected time of use program; and if not, then refusing to assign the meter to the selected time of use program.

6. The method of claim 5, wherein identifying the operating territory within which the meter operates comprises:

identifying a collector with which the meter is registered; and identifying that the collector is assigned to the operating territory.

7. The method of claim 5, comprising retrieving the set of time of use programs assigned to the operating territory from a database that stores a plurality of sets of time of use programs each assigned to one of a plurality of operating territories within a meter reading system.

8. A method for attempting to register a meter with a previously assigned time of use program to a collector comprising:

identifying the previously assigned time of use program;

determining whether the previously assigned time of use program is a member of a set of at least one time of use program stored at the collector;

if so, then:

registering the meter with the collector; and configuring the meter with an index of the previously assigned time of use program; and if not then refusing to register the meter with the collector.

9. The method of claim 8, further comprising:

receiving a command to assign the meter to an operating territory;

retrieving a set of time of use programs assigned to the operating territory;

assigning the meter to the operating territory; and selecting one of the set of time of use programs assigned to the operating territory to be the previously assigned time of use program.

10. The method of claim 9, comprising retrieving the set of time of use programs assigned to the operating territory from a database that stores a plurality of sets of time of use programs each assigned to one of a plurality of operating territories within a meter reading system.

11. A meter reading system comprising:

a collector that receives meter data from at least one meter;

a server that is operative to receive a command to assign the collector to an operating territory within the meter reading system, and, responsive to the command, provide instructions to configure the collector with a set of time of use programs assigned to the operating territory, and wherein the server is further operative to determine whether a selected time of use program to which to assign a registered meter is a member of the set of time of use programs assigned to the operating territory.

12. The system of claim 11, further comprising a user interface that enables a user to assign the set of time of use programs to the operating territory.

13. The system of claim 11, further comprising a user interface that enables a user to assign the collector to the operating territory.

14. The system of claim 11, further comprising an application program interface that receives a command from a software package to assign the collector to the operating territory.

15. The system of claim 11, further comprising a device configuration database that stores a plurality of sets of time of use programs each assigned to one of a plurality of operating territories within the meter reading system.

16. The system of claim 11, wherein the server is operative to refuse to assign the registered meter to the selected time of use program if the selected time of use program is not a member of the set of time of use programs assigned to the operating territory.

17. The system of claim 11, wherein the server is operative to determine whether a meter that is attempting to register with the collector is within the operating territory.

18. The system of claim 17, wherein the server is operative to refuse to register the meter if the meter is not within the operating territory.

19. The system of claim 11, further comprising a user interface that enables a user to assign a meter to the operating territory.

20. The system of claim 11, further comprising an application program interface that receives a command from a software package to assign a meter to the operating territory.

* * * * *

UNITED STATES PATENT AND TRADEMARK OFFICE
CERTIFICATE OF CORRECTION

PATENT NO. : 7,170,425 B2 Page 1 of 1
APPLICATION NO. : 10/949927
DATED : January 30, 2007
INVENTOR(S) : Russell G. Christopher et al.

It is certified that error appears in the above-identified patent and that said Letters Patent is hereby corrected as shown below:

Title Page,
Item (56) References Cited,

U.S. PATENT DOCUMENTS:
Page 3, 5,621,629A reference, delete "Hemminer et al." and insert -- Hemminger et al. --.

OTHER PUBLICATIONS:
Page 4, "Internet Prinout," reference, delete "Internet Prinout, http://ww.ardis.com/RADIO," and insert -- Internet Printout, http://www.ardis.com/RADIO, --.
Page 4, "Shachan, N. et al." reference, delete "Shachan, N. et al." and insert -- Shacham, N. et al. --.

Column 2,
Line 38, after "database" insert -- . --.

Column 4,
Line 10, delete "a electrical" and insert -- an electrical --.
Line 11, delete "meters" and insert -- meter --.
Line 63, delete "may the" and insert -- may be the --.

Signed and Sealed this

Fourth Day of September, 2007

JON W. DUDAS
*Director of the United States Patent and Trademark Office*